May 9, 1950 H. MASBRUCH 2,507,212
CALF WEANER
Filed Nov. 24, 1944 2 Sheets-Sheet 1

INVENTOR.
HENRY MASBRUCH,
BY
Lester Sargent
ATTORNEY.

May 9, 1950        H. MASBRUCH        2,507,212
CALF WEANER
Filed Nov. 24, 1944        2 Sheets—Sheet 2
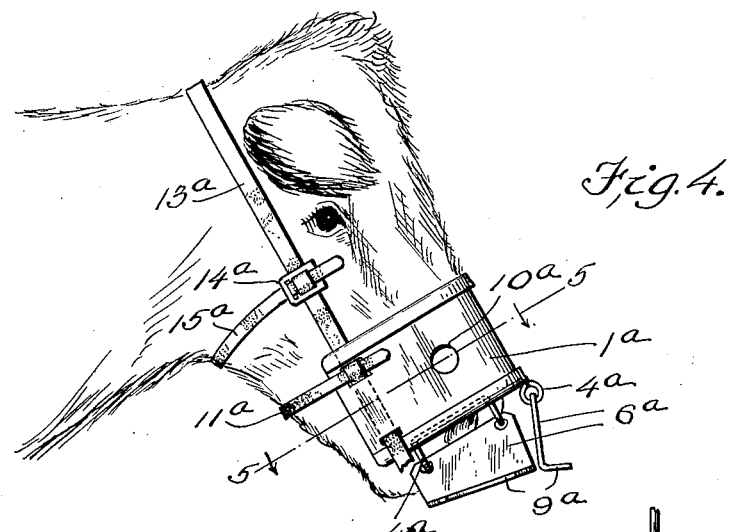
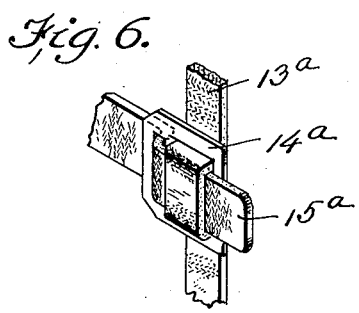
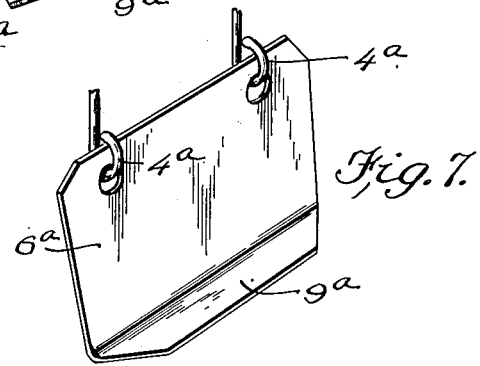
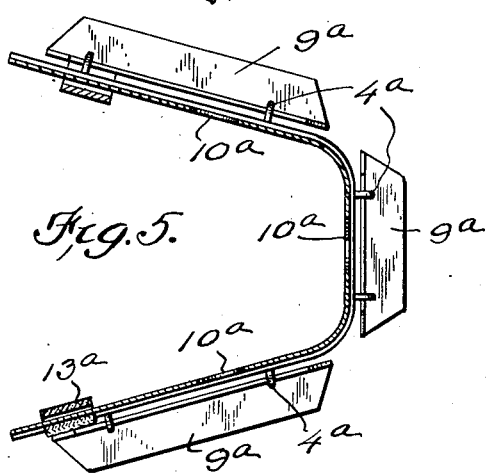
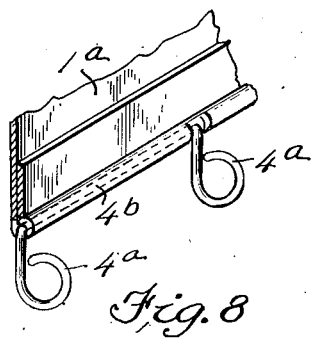
HENRY MASBRUCH,
INVENTOR.
BY Lester L. Sargent
Attorney.

Patented May 9, 1950

2,507,212

UNITED STATES PATENT OFFICE 2,507,212

CALF WEANER

Henry Masbruch, Platteville, Wis., assignor to Russell Manufacturing Company, Platteville, Wis.

Application November 24, 1944, Serial No. 565,009

3 Claims. (Cl. 119—131)

The object of my invention is to provide a novel and effective calf weaner which is so designed that the animal can eat or graze without trouble but preventing the calf from nursing. It is also an object of my invention to provide a device that can be worn by the calf without discomfort and which will not interfere with its ordinary habits except nursing. It is further an object of my preferred embodiment of the in-invention to provide a device of this type which will not chip, break, or hurt either the calf or the mother. I attain these and other objectives of my invention by the device illustrated in the accompanying drawings in which:

Fig. 4 is a side elevation of another form of the invention applied to the head of a calf;

Fig. 5 is a section on line 5—5 of Fig. 4 but on a larger scale;

Fig. 6 is a detailed perspective view of the strap buckle;

Fig. 7 is a perspective view of the front tab 6a; and

Fig. 8 is a detailed perspective view of one of the hinge members.

Figure 1:
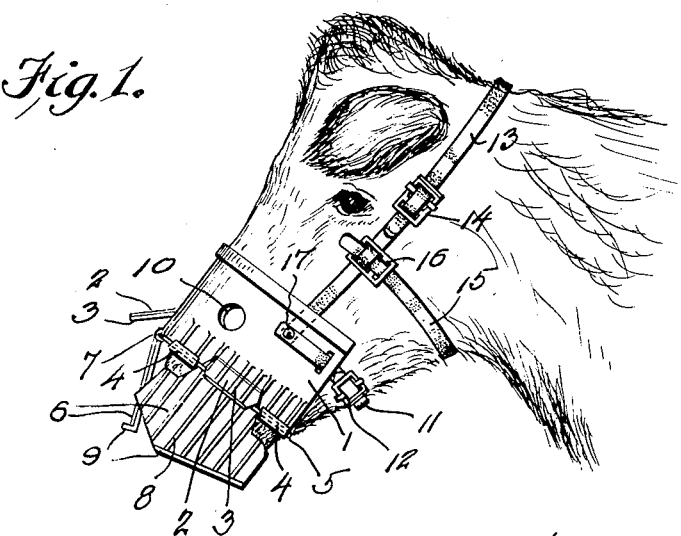
Figure 1 is a side elevation of the invention applied to the head of a calf.
Figure 2:
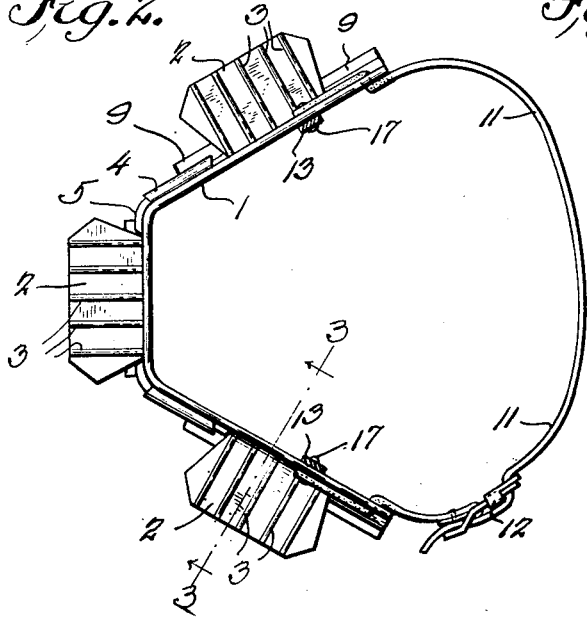
Fig. 2 is a top plan view of the device, the straps 13 being shown in section.
Figure 3:
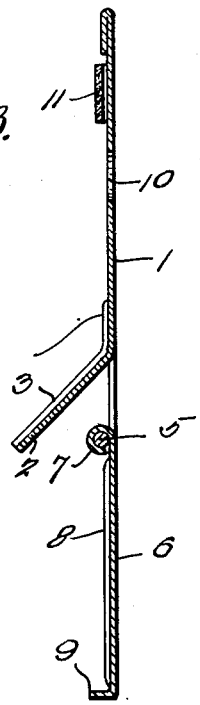
Fig. 3 is a section on line 3—3 of Fig. 2.

Referring to Figs. 1, 2 and 3 which show the preferred form of my invention, I provide a calf weaner plate 1 of approximately arcuate shape to fit over the head of the calf as shown in the drawings, and functioning as a weaner guard plate, and having outwardly bent integral tabs 2 which project slightly at an obtuse angle to the approximately arcuate plate 1, each of which has reinforcing ribs 3. The function of the tabs 2 is to prevent the calf from swinging the swinging tabs 6 upwardly so that they will lie along the plate 1 and permit the calf to nurse. The two side tabs 2 act in a similar manner to the front tab 2, as their function is to prevent the calf from tossing the swinging tabs 6 to an upward reversed position alongside the plate 1 to permit the calf when it turns its head sideways to nurse.

On the lower edge of the lateral portions of the calf weaner plate 1 there are formed hinge sockets 4, as shown in Fig. 2, for a hinge pintle 5, and from this pintle 5 depend the swinging tabs 6, which along their upper edges have the hinges 7, such as shown in Fig. 3. The swinging tabs 6 also may have ribs 8, for reinforcement.

Each of the three swinging tabs 6 is provided with a narrow outwardly projecting lip 9, as shown in Figs. 1 and 3, which preferably is integral with the respective tab 6.

The calf weaner plate 1 is provided with ventilator apertures 10.

Attached to the plate 1 by suitable rivets 17 are the head strap 13 and the chin strap 11. The headstrap has a suitable buckle 14 and the chin strap 11 has a suitable buckle 12. A third or throat strap 15 is adjustably connected to the head strap 13 by a suitable buckle 16, as shown in Fig. 1.

When the animal desires to graze, the three swinging tabs 6 swing outwardly and away from the animal's mouth so as not to interfere with grazing. But if the animal raises his head and attempts to nurse, the tabs swing downwardly and prevent nursing. If the calf attempts to toss the swinging tabs 6 upwardly and out of his way against the plate 1, the projecting tabs 2 will prevent his doing so. Gravity will cause all of the tabs to remain in a depending position, or to return to one. Cows and calves graze with a front to back pull and the tabs do not prevent grazing.

The several straps securely fasten the device to the head of the animal and permit of adjustment so that the animal can wear the device without discomfort. The ribs or corrugations on the tabs increase the strength of the device.

Referring to Figs. 4–8 of the drawings, there is illustrated another form of the invention in which 1a is the calf weaner plate which fits around the lower part of the head of the animal and has hinge elements 4b and 4a from which the swinging tabs 6a depend. These swinging tabs 6a are provided with outstanding lips 9a. The plate 1 has suitable ventilator apertures 10a. The plate 1a is attached to a chin strap 11a and to a head strap 13a, while a throat strap 15a is connected with the headstrap 13a by buckles 14a, as shown in Fig. 4.

When the animal seeks to graze, the tabs 6a swing outwardly and permit the animal to graze while if it seeks to nurse, they swing downward so as to prevent the animal from nursing.

Either form of the invention is equally successful when made in larger sizes for grown animals to stop them from sucking.

What I claim is:

1. In a calf weaner, the combination of a guard plate fitting over the lower portion of the head of the animal and having short integral tabs extending outwardly in an obtuse angle at the front and sides of the guard plate, and swinging tabs hingedly suspended from the weaner guard plate, each of said swinging tabs having an outwardly extending lip to cause the tabs to swing outwardly when the animal lowers its head to graze.

2. In a calf weaner the combination of a weaner guard plate fitting over the lower portion of the head of the animal and having fixed tabs extending outwardly from the front and sides of the guard plate at an angle thereto, a pintle connected to the lower edge of the guard plate, and swinging tabs hingedly connected to said pintle, each of said swinging tabs having an outwardly extending lip, the fixed tabs preventing the swinging tabs from being tossed into a reversed position against the weaner guard plate.

3. In a calf weaner which permits the calf to graze while interfering with its nursing, the combination of a guard plate having front and side portions adapted to fit over the nose of the calf, means adjustably securing the guard plate to the head of the calf, a freely and independently swinging tab depending from the lower edge of each of the two sides and a freely and independently swinging tab depending from the lower edge of the front wall of the guard plate, the tabs being so shaped and dimensioned that their lower edges are about in the plane of the mouth of the calf when the calf's head is in normal position, and an outwardly extending lip projecting from the lower end of each of said tabs, each lip extending substantially at right angles to the general plane of the tab.

HENRY MASBRUCH.

REFERENCES CITED

The following references are of record in the file of this patent:

UNITED STATES PATENTS

| Number | Name | Date |
| --- | --- | --- |
| 172,468 | Miller | Jan. 18, 1876 |
| 349,104 | Jones | Sept. 14, 1886 |
| 393,341 | O'Hare | Nov. 20, 1888 |
| 481,985 | Tyler | Sept. 6, 1892 |
| 683,104 | Daggett | Sept. 24, 1901 |
| 709,140 | Daggett | Sept. 16, 1902 |
| 1,428,794 | Myer et al. | Sept. 22, 1922 |
| 1,626,090 | Krauss | Apr. 26, 1927 |
| 1,748,027 | Rasmussen | Feb. 18, 1930 |
| 2,224,418 | Wheat | Dec. 10, 1940 |